US006763650B1

(12) United States Patent
Snow

(10) Patent No.: US 6,763,650 B1
(45) Date of Patent: Jul. 20, 2004

(54) CALF ROPING APPARATUS

(76) Inventor: Robert D. Snow, Rural Route 1, Box 54, Bingham, IL (US) 62011

( * ) Notice: Subject to any disclaimer, the term of this patent is extended or adjusted under 35 U.S.C. 154(b) by 0 days.

(21) Appl. No.: 10/452,090

(22) Filed: May 30, 2003

(51) Int. Cl.[7] .............................. B68B 1/00; A01K 15/04
(52) U.S. Cl. ........................................... 54/71; 119/712
(58) Field of Search .......................... 54/71, 1; 119/712

(56) References Cited

U.S. PATENT DOCUMENTS

| 2,821,960 | A | * | 2/1958 | Rudolph | 119/712 |
| 3,319,605 | A | * | 5/1967 | Early et al. | 119/712 |
| 4,214,420 | A | * | 7/1980 | Ferree | 54/35 |
| 5,519,986 | A | * | 5/1996 | Raffit | 54/71 |
| 5,941,198 | A | * | 8/1999 | Sullivan | 119/805 |
| 6,058,686 | A | * | 5/2000 | Wheeler | 54/71 |

* cited by examiner

Primary Examiner—Charles T. Jordan
Assistant Examiner—Bret Hayes
(74) Attorney, Agent, or Firm—Philip L. Bateman

(57) ABSTRACT

An apparatus reminds a saddled and bridled horse to maintain tension on a calf rope during a rodeo calf roping event. The apparatus contains: (a) a ratcheting rope pulley with a release; (b) a means for attaching the pulley to a saddle; (c) a rope passing through the pulley with the first end of the rope exiting the pulley in the freely rotating direction and the second end of the rope exiting the pulley in the non-rotating direction; (d) an elastic cord having a first end attached to the second end of the rope; (e) a means for attaching the second end of the cord to a calf rope; and (f) a means for attaching the cord-calf rope attachment to a bit of a bridle.

8 Claims, 5 Drawing Sheets

CALF ROPING APPARATUS

FIELD OF THE INVENTION

This invention relates to the sport of rodeo. More particularly, this invention relates to an apparatus for use during the calf roping event that automatically reminds the horse to maintain tension on the calf rope.

BACKGROUND OF THE INVENTION

Rodeo is a sport in which contestants compete in events that feature skills that were highly valued by cowboys in the American Old West of the latter half of the Nineteenth Century. There are two main groups of rodeo events: (1) rough stock events; and (2) timed events. Rough stock events feature a contestant trying to ride a bucking horse or bull. Timed events feature a contestant on horseback trying to gain control over a calf or steer with a rope.

One of the most popular and exciting of the timed events is calf roping. Calf roping is based on an activity that was frequently performed in the Old West when cowboys caught calves so they could be branded or given medical treatment. In the rodeo calf roping event, a contestant on horseback chases a calf in a ring, throws a lasso (a long rope with a running noose at the far end) around the calf's neck, and then dismounts. The contestant pulls on a jerk line connected to the horse's bridle to cause the horse to back up so that tension is maintained on the calf rope. The tension on the calf rope prevents the calf from breaking free. The contestant then approaches the calf, throws it to the ground, and ties three of its legs together with a piece of "pigging" string he has carried between his teeth. The contestant then returns to his horse, mounts it, and rides forward to create slack on the calf rope. If the calf remains tied for six seconds, the time that was required to complete the tying of the calf's legs is recorded. The object of the event is to complete the tasks in a minimum amount of time. Calf roping requires a variety of skills on the part of the contestant. It also requires close cooperation between the contestant and his horse.

FIG. 1 illustrates some of the equipment used during conventional calf roping. A horse 10 is outfitted with a conventional saddle 20 and a conventional bridle 30. The saddle contains a fork with an upwardly projecting horn 21. The bridle contains a headstall 31, reins 32, and a bit consisting of a noseband 33, a chin strap 34, shanks 35, and a shank bar 36. When the reins are pulled, the shanks pivot and pressure is applied to the horse by the chin strap. A calf rope 40 is shown attached to the horn of the saddle. The far end of the calf rope, not shown, is looped around the neck of a calf. A jerk line 50 consists of a rope 51 passing through a pulley 52. The pulley is tied to the saddle ring with string 53. One end of the jerk line is attached to the shank bar with a knot 54. The other end of the jerk line is held by the contestant until he releases it upon reaching the roped calf. Pulling on the jerk line pulls the horse's head down and back. Through extensive training, the horse responds to this pressure by backing up.

Two additional comments about FIG. 1 are necessary. First, two pieces of conventional calf roping equipment are omitted from FIG. 1 for clarity. The first omitted item is a neck rope that drapes around the horse's neck and over the calf rope. The neck rope helps ensure that the horse faces the calf at all times. The second omitted item is a tiedown that runs from the noseband to the cinch on the saddle. The purpose of the tiedown is to keep the horse's head down. Second, the bit shown in FIG. 1, commonly known as a Hackamore bit, differs from many bits in that it does not contain a bar that fits within the horse's mouth. Although effective for control, a bar in the mouth is very uncomfortable to the horse. For this reason, some contestants do not use such bars with their horses if they are able to achieve the desired response from the horse with only a chin strap. The term "bit" is used hereinafter to refer to that part of the bridle that is moved against the horse by pulling on the reins, whether it be a chin strap in a Hackamore bit, a bar in the horse's mouth, or the like.

As mentioned above, pulling on the jerk line causes the horse to back up to maintain tension on the calf rope. However, it is difficult for the contestant to pull the jerk line as he is running at full speed toward the roped calf. Furthermore, the contestant must let go of the jerk line when he reaches the calf because both hands are needed to tie the calf's legs. Once the jerk line is released, the horse is free to move. It is very difficult to train a horse to continue to back up even after the jerk line is released.

Accordingly, there is a demand for an apparatus that replaces the conventional jerk line and that automatically reminds the horse to maintain tension on the calf rope.

SUMMARY OF THE INVENTION

One general object of this invention is to provide an apparatus that automatically reminds the horse to maintain tension on the calf rope. Another general object of this invention is to provide an improved method for reminding a horse to maintain tension on the calf rope during the calf roping event.

I have invented an apparatus for reminding a saddled and bridled horse to maintain tension on a calf rope during a rodeo calf roping event. The apparatus comprises: (a) a ratcheting rope pulley with a release, the pulley rotating freely in one direction and not rotating in the other direction unless the release is depressed; (b) a means for attaching the pulley to a saddle; (c) a rope having a first end and a second end, the rope passing through the pulley with the first end of the rope exiting the pulley in the freely rotating direction and the second end of the rope exiting the pulley in the non-rotating direction, the rope having a length of about one to three feet; (d) an elastic cord having a first end and a second end, the first end of the cord being attached to the second end of the rope, the elastic cord having a length of about one to two feet; (e) a means for attaching the second end of the cord to a calf rope; and (f) a means for attaching the cord-calf rope attachment to a bit of a bridle.

I have also invented a method for a contestant to remind a saddled and bridled horse to maintain tension on a calf rope during a rodeo calf roping event. The method comprises: (a) obtaining an apparatus comprising: (i) a ratcheting rope pulley with a release, the pulley rotating freely in one direction and not rotating in the other direction unless the release is depressed; (ii) a means for attaching the pulley to a saddle; (iii) a rope having a first end and a second end, the rope passing through the pulley with the first end of the rope exiting the pulley in the freely rotating direction and the second end of the rope exiting the pulley in the non-rotating direction, the rope having a length of about one to three feet; (iv) an elastic cord having a first end and a second end, the first end of the cord being attached to the second end of the rope, the elastic cord having a length of about one to two feet; (iv) a means for attaching the second end of the cord to a calf rope; and (v) a string for attaching the cord-calf rope attachment to a bit of a bridle; (b) positioning the apparatus rope in the pulley such that the rope is fully extended in the non-rotating direction; (c) connecting the apparatus by attaching the pulley to the saddle, attaching the second end of the cord to the calf rope at a distance from the saddle equal to the combined lengths of the apparatus rope and cord, and attaching the string from the cord-calf rope attachment to the bit of the bridle such that a slight amount of slack is in the string when there is tension on the calf rope; (d) mounting the horse, throwing the calf rope around the neck of a calf, stopping the horse with tension on the calf rope, and dismounting; (e) pulling the first end of the rope to stretch the cord and thereby apply pressure to the bit if the horse allows the calf rope to slacken; (f) tying the legs of the roped calf; (g) returning to the horse and depressing the release of the ratcheting pulley; and (h) mounting the horse.

The calf roping apparatus of this invention is a significant improvement over the conventional jerk line. The apparatus can be configured to set automatically when the contestant dismounts. Once set, the apparatus automatically reminds the horse to maintain tension on the calf rope. The use of the apparatus is highly effective and it provides no discomfort to a horse that properly maintains tension on the calf rope.

DETAILED DESCRIPTION OF THE INVENTION

1. The Apparatus

Figure 1:
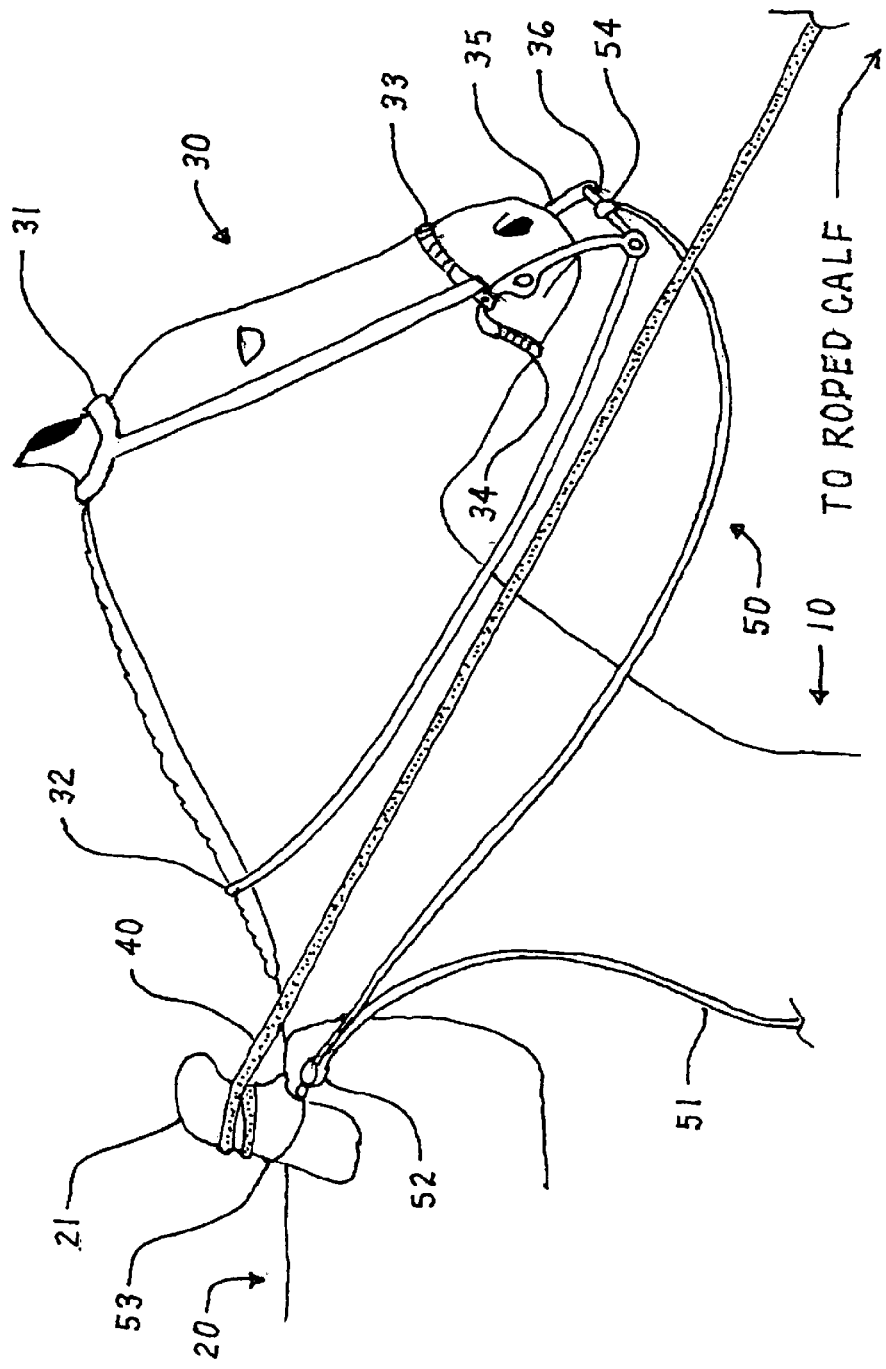
FIG. 1 is a view of a front portion of a saddled and bridled horse showing a portion of the prior art equipment used in calf roping.
Figure 2:
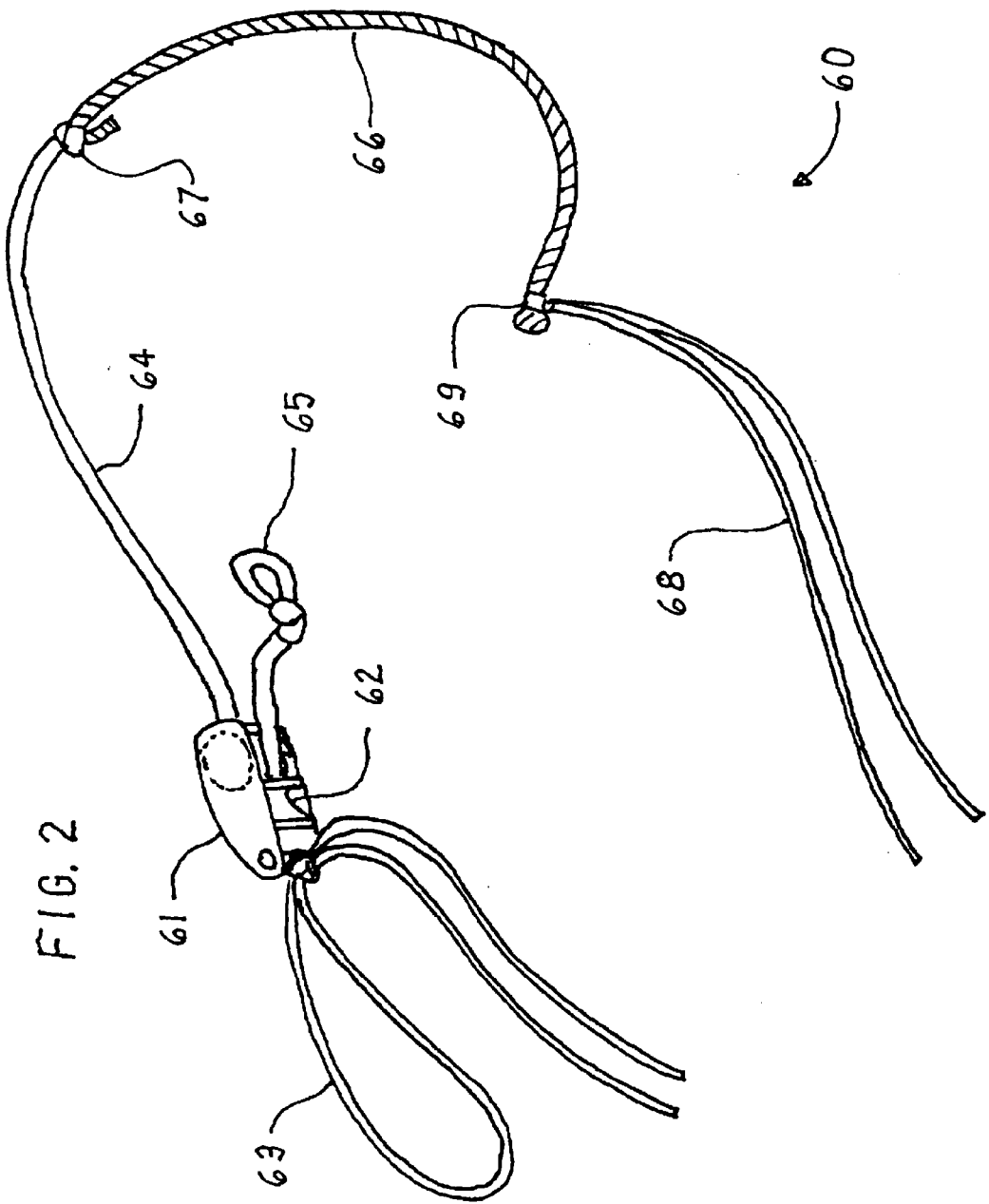
FIG. 2 is a perspective view of the calf roping apparatus of this invention.

A preferred embodiment of the calf roping apparatus 60 of this invention is shown in FIG. 2. The apparatus comprises several components, the first of which is a ratcheting rope pulley 61. The pulley contains a wheel with sloping teeth that are engaged by a hinged release 62. The pulley rotates freely in one direction but does not rotate in the other direction unless the release is depressed. From the view shown in FIG. 2, the pulley rotates freely in the counterclockwise direction. Ratcheting rope pulleys are standard items of commerce and are widely available. A preferred pulley is a ROPE RATCHET pulley for one-fourth-inch-diameter rope manufactured by Carolina North Manufacturing, Inc. of Kernersville, N.C. This pulley is disclosed in Skyba, U.S. Pat. No. 5,368,281, issued Nov. 29, 1994.

The second component of the calf roping apparatus is a means for attaching the pulley to a saddle. In the preferred embodiment, the means consists of a four-foot-long piece of one-eighth-inch-diameter string 63 of the type used as parachute cord that is tied to a post of the pulley with an overhand knot. As shown, the saddle-attaching string is formed into a loop with two loose ends. A variety of other attachment means such as hooks, clips, and the like are also suitable.

The third component of the calf roping apparatus is a rope 64 that passes through the pulley. The rope is generally about one to three feet long and is most preferably about twenty-four inches long. The rope is made of nylon, polypropylene, dacron, hemp, cotton, or the like. In the preferred embodiment, the rope is one-fourth-inch-diameter braided nylon. The first end of the rope, the end exiting the pulley in the freely rotating direction, preferably contains a loop 65 formed by a honda knot, the purpose of which is described below.

The fourth component of the calf roping apparatus is an elastic cord 66. One end of the cord is attached by a square knot 67 to the end of the rope exiting the pulley in the non-rotating direction. The cord has a length of about one to two feet and is most preferably about one and one-half feet (eighteen inches) long. The cord generally has sufficient elasticity to stretch to at least about 150 percent of its length (1.5 times its length) upon the application of a force of twenty pounds. In the preferred embodiment, the elastic cord is made of bungee cord having a diameter of about three-eighths of an inch. Bungee cord has a number of parallel rubber lines encased within a jacket of wound nylon thread. Bungee cord can generally stretch to over two times its length without breaking. The most preferred bungee cord stretches to over 150 percent of its length upon the application of a force of ten pounds. As will be evident, the elasticity of the cord affects the force needed to set the apparatus and also affects the force exerted upon the horse if slack is allowed in the calf rope.

The fifth component of the calf roping apparatus is a means for attaching the second end of the elastic cord to a calf rope and the sixth component is a means for attaching the cord-calf rope attachment to a bit. In the preferred embodiment, both means consist of a three-foot-long piece of one-eighth-inch-diameter string 68 of the type used as parachute cord attached by a slip knot 69 at the end of the cord so there are two loose ends of equal length. A variety of other attachment means such as hooks, clips, and the like are also suitable.

2. The Connection of the Apparatus

Figure 3:
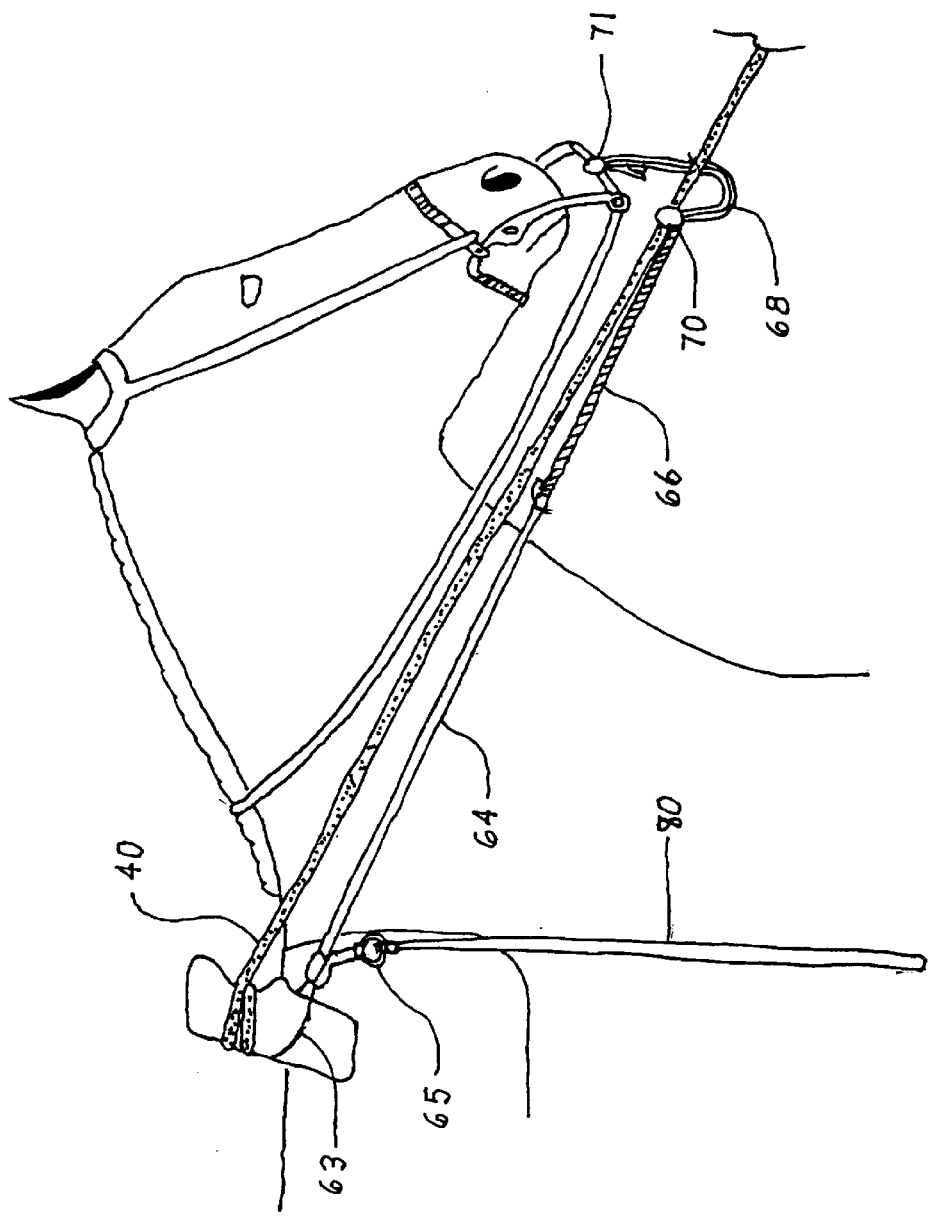
FIG. 3 is a view of a front portion of a saddled and bridled horse showing the calf roping apparatus of this invention connected to other equipment as it appears immediately after a calf is roped.

The calf roping apparatus of the invention is connected to the other calf roping equipment in three places as illustrated in FIG. 3. The first connection is an attachment of the ratcheting rope pulley to the saddle. This attachment is preferably made by tying the saddle-attaching string around the fork of the saddle. The string is preferably secured with a square knot.

The second connection is an attachment of the second end of the elastic cord to the calf rope. Before doing this, the calf rope is extended forward as it would be if a calf were in front and the rope of the apparatus is fully extended (payed out) in the non-rotating direction so that the first end of the rope is flush against the pulley. The second end of the cord is then attached to the calf rope at a distance from the saddle equal to the combined lengths of the apparatus rope and cord. In other words, the point of attachment is the point at which the second end of the cord extends when the rope and cord of the apparatus are placed parallel to the calf rope without stretching the cord. The attachment is preferably made with an overhand knot 70 using the calf-rope-attaching string. Other suitable knots are double and triple half-hitch knots. It is essential that the knot be so secure that it will not slip.

The third connection is an attachment of the cord-calf rope attachment to the bit of the bridle. This attachment is preferably made by taking the loose ends of the calf-rope-attaching string from the knot on the calf rope and tying them to the middle of the shank bar in an overhand knot 71. A slight amount of slack is left in the string between the knot on the calf rope and the knot on the shank bar. In FIG. 3, a relatively large amount of slack is shown for illustration. In practice, the amount of the slack is preferably considerably less.

The calf roping apparatus of this invention is optionally connected to a means for "setting" the calf roping apparatus, i.e., for pulling the first end of the calf roping apparatus rope all the way out from the pulley to fully stretch the elastic cord. A preferred setting means is a setting line 80. The setting line is about six feet in length with a clasp 81 for temporary attachment to the loop at the end of the calf roping apparatus rope. The use of the setting line is described in more detail in the following section.

3. The Use of the Apparatus During Calf Roping

The use of the calf roping apparatus of this invention can now be considered. The apparatus is connected as described in the preceding section and as shown in FIG. 3. The contestant places the pigging string in his mouth, mounts the horse, holds onto the reins with one hand, and holds onto the lasso (the calf rope) with the other hand. The contestant is now ready for the calf to be released.

As soon as the calf is released, the contestant on horseback chases it from behind. The contestant throws the lasso around the calf's neck and pulls it to tighten the noose. The contestant then pulls on the reins to stop the horse. The calf continues running until it comes to the end of the calf rope line. The contestant then quickly dismounts.

As the contestant is dismounting, he "sets" the apparatus by pulling the first end of the calf roping apparatus rope all the way out from the pulley to fully stretch the elastic cord. The ratchet mechanism of the pulley holds the rope in this position until released. The contestant can set the apparatus by pulling the end of the rope with his hand, but this is a time-consuming step that is preferably eliminated. One way of eliminating this step is to use a setting means that automatically sets the apparatus. A simple and suitable setting means is a releasable connection between the first end of the calf roping apparatus rope and the contestant's body. The releasable connection is strong enough to pull the calf apparatus rope out to set the apparatus as the contestant takes the first steps away from the horse and toward the calf, but will finally release as the contestant gets farther away.

One suitable setting means is a setting line connected as described in the preceding. To use the setting line, it is first put into an S shape and inserted under the contestant's belt prior to the event. If the belt is sufficiently tight, the setting line will pull the first end of the calf roping apparatus all the way out from the pulley as the contestant moves toward the calf, but will not slip from the belt until the contestant gets further away. Other types of releasable connections are suitable, provided they are strong enough to set the apparatus and then release when the contestant gets a certain distance away from the horse. For example, a tear-away strip or a connection containing a VELCRO hook and loop material joint are alternatives to the setting rope.

Figure 4:
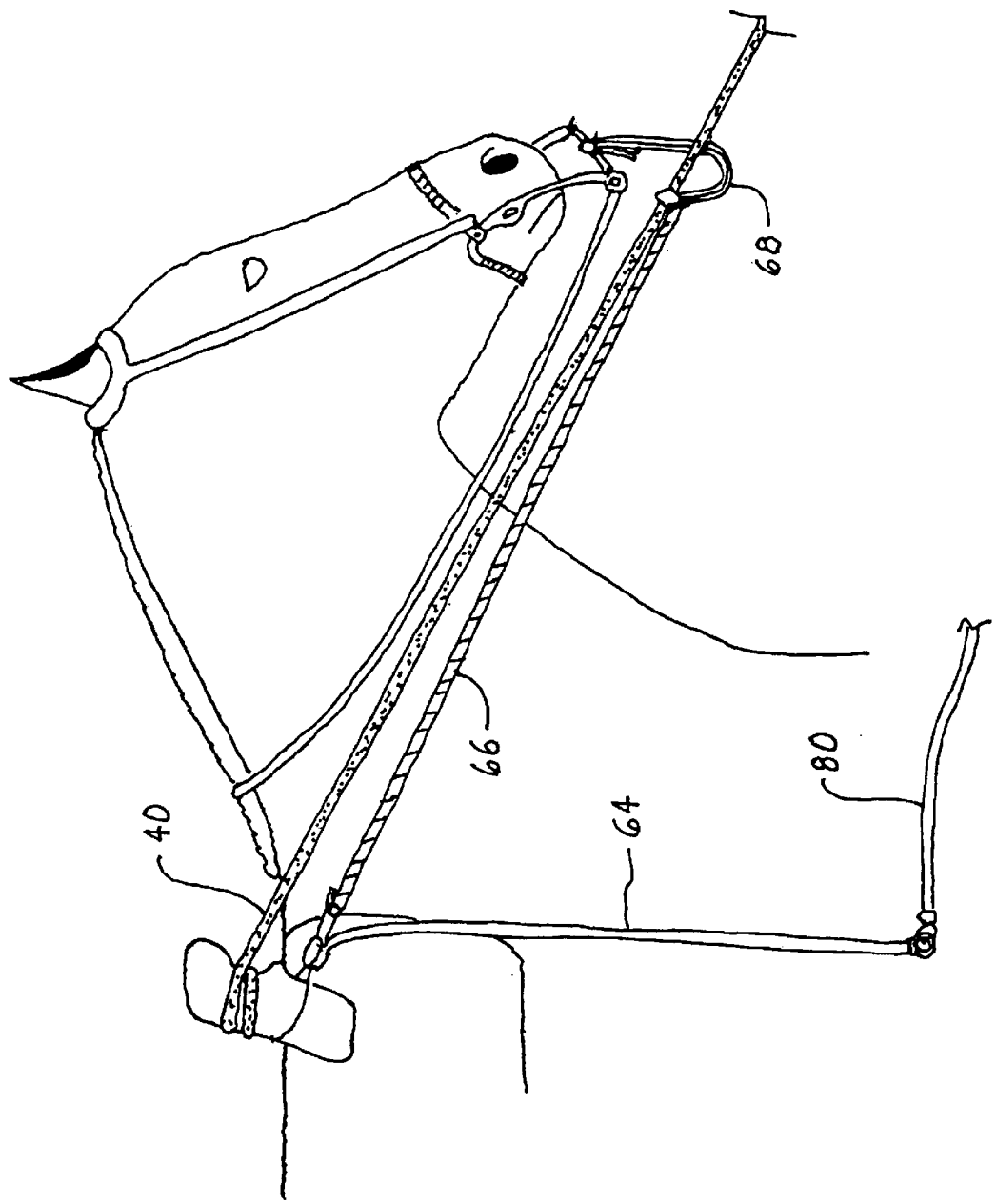
FIG. 4 is a view of a front portion of a saddled and bridled horse showing the calf roping apparatus of this invention connected to other equipment as it appears immediately after the contestant dismounts and leaves the horse to approach the roped calf.

FIG. 4 shows the calf roping apparatus in the set position with tension on the calf rope. The elastic cord is fully stretched from the pulley to the point at which it is attached to the calf rope. However, the string between the cord-calf rope attachment and the bit remains slack because the force pulling on the calf rope far exceeds the force exerted by the elastic cord.

Figure 5:
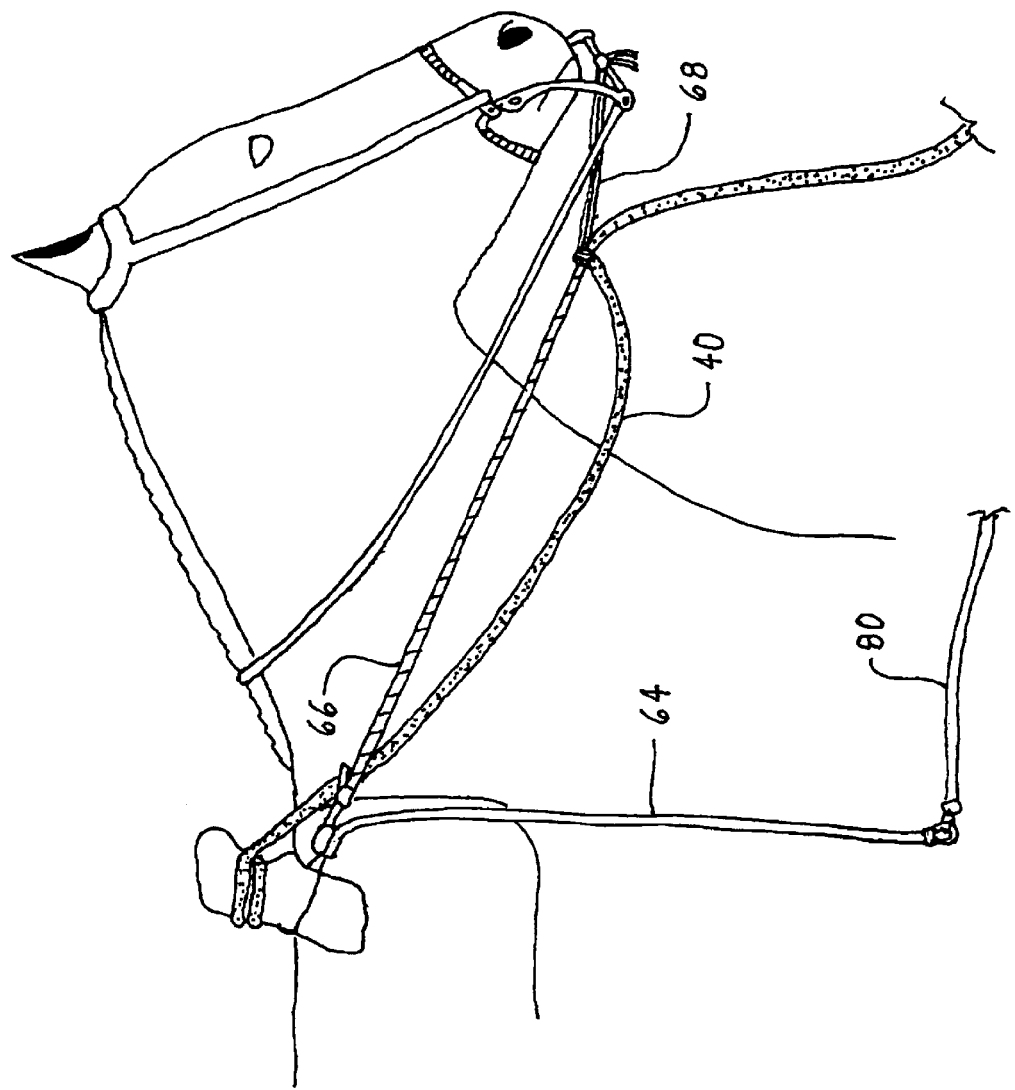
FIG. 5 is a view of a front portion of a saddled and bridled horse showing the calf roping apparatus of this invention connected to other equipment as it appears if the horse allows slack to develop in the calf rope.

FIG. 5 shows the calf roping apparatus in the position it takes if slack develops in the calf rope. If slack develops, there is no longer a force pulling on the calf rope and the elastic cord is then free to contract. As it contracts, it pulls on the string between the cord-calf rope attachment and the bit. The pulling on the bit is uncomfortable and it reminds the horse to back up. As soon as the horse backs up enough to again create tension on the calf rope, the calf roping apparatus returns to its set position and the pulling on the bit ceases.

After the contestant ties the legs of the calf, he returns to the horse. He depresses the release of the ratcheting rope pulley and the apparatus returns to the position it had before being set. The contestant is then free to remount the horse and ride toward the roped calf.

The use of the calf roping apparatus of this invention automatically reminds the horse to maintain tension on the calf rope. If the horse maintains constant tension on the calf rope, the apparatus plays only a back-up role. In other words, the horse does not know the apparatus is connected. However, if the horse fails to maintain constant tension, the apparatus provides the necessary reminder by pulling on the bit. The amount of force applied to the bit is proportional to the amount of slack in the calf rope. In other words, if the horse allows a small amount of slack to develop in the calf rope, the pull on the bit is relatively light. However, if a large amount of slack develops, the pull on the bit is much heavier.

What is claimed is:

1. A method for a contestant to remind a saddled and bridled horse to maintain tension on a calf rope during a rodeo calf roping event, the method comprising:

(a) obtaining an apparatus comprising: (i) a ratcheting rope pulley with a release, the pulley rotating freely in one direction and not rotating in the other direction unless the release is depressed; (ii) a means for attaching the pulley to a saddle; (iii) a rope having a first end and a second end, the rope passing through the pulley with the first end of the rope exiting the pulley in the freely rotating direction and the second end of the rope exiting the pulley in the non-rotating direction, the rope having a length of about one to three feet; (iv) an elastic cord having a first end and a second end, the first end of the cord being attached to the second end of the rope, the elastic cord having a length of about one to two feet; (iv) a means for attaching the second end of the cord to a calf rope; and (v) a string for attaching the cord-calf rope attachment to a bit of a bridle;

(b) positioning the apparatus rope in the pulley such that the rope is fully extended in the non-rotating direction;

(c) connecting the apparatus by attaching the pulley to the saddle, attaching the second end of the cord to the calf rope at a distance from the saddle equal to the combined lengths of the apparatus rope and cord, and attaching the string front the cord-calf rope attachment to the bit of the bridle such that a slight amount of slack is in the string when there is tension on the calf rope;

(d) mounting the horse, throwing the calf rope around the neck of a calf, stopping the horse with tension on the calf rope, and dismounting;

(e) pulling the first end of the rope to stretch the cord and then releasing the first end, thereby freeing both hands of the contestant and applying pressure to the bit of the bridle if the horse allows the calf rope to slacken;

(f) tying the legs of the roped calf;

(g) returning to the horse and depressing the release of the ratcheting pulley; and (h) mounting the horse.

2. The method of claim 1 wherein the apparatus elastic cord has sufficient elasticity to stretch to at least about 150 percent of its resting length upon the application of a force of twenty pounds.

3. The method of claim 2 wherein the apparatus rope has a length of about two feet and the apparatus elastic cord has a length of about one and one-half feet.

4. The method of claim 3 wherein the apparatus rope is made of braided nylon and has a diameter of about one-fourth inch.

5. The method of claim 4 wherein the apparatus means for attaching the pulley to a saddle comprises a length of string tied to the pulley.

6. The method of claim 5 wherein the apparatus means for attaching the second end of the cord to the calf rope and the apparatus means for attaching the cord-calf rope attachment to the bit comprise a length of string tied to the second end of the cord.

7. The method of claim 6 wherein the first end of the apparatus rope is pulled by a releasable connection to the contestant's body.

8. The method of claim 7 wherein the releasable connection comprises a setting line.

\* \* \* \* \*